(12) United States Patent
Komamura

(10) Patent No.: US 9,296,360 B2
(45) Date of Patent: Mar. 29, 2016

(54) VEHICLE OCCUPANT PROTECTION DEVICE

(71) Applicant: Toyota Jidosha Kabushiki Kaisha, Toyota-shi, Aichi-ken (JP)

(72) Inventor: Tatsuya Komamura, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 14/463,147

(22) Filed: Aug. 19, 2014

(65) Prior Publication Data

US 2015/0054267 A1 Feb. 26, 2015

(30) Foreign Application Priority Data

Aug. 23, 2013 (JP) ................. 2013-173566

(51) Int. Cl.
| | |
|---|---|
| *B60R 21/276* | (2006.01) |
| *B60R 21/013* | (2006.01) |
| *B60R 21/0136* | (2006.01) |
| *B60R 21/231* | (2011.01) |
| *B60R 21/239* | (2006.01) |
| *B60R 21/00* | (2006.01) |

(52) U.S. Cl.
CPC ............ *B60R 21/276* (2013.01); *B60R 21/013* (2013.01); *B60R 21/0136* (2013.01); *B60R 21/231* (2013.01); *B60R 21/239* (2013.01); *B60R 2021/0023* (2013.01); *B60R 2021/2395* (2013.01); *B60R 2021/23107* (2013.01); *B60R 2021/2765* (2013.01)

(58) Field of Classification Search
CPC .. B60R 21/276; B60R 21/239; B60R 21/231; B60R 21/0136; B60R 2021/2395; B60R 2021/2765; B60R 2021/0023

USPC ........................... 280/730.2, 735, 742
See application file for complete search history.

(56) References Cited

U.S. PATENT DOCUMENTS

| | | | | |
|---|---|---|---|---|
| 6,113,134 A | * | 9/2000 | Lim | 280/730.1 |
| 7,040,653 B1 | * | 5/2006 | Breed | 280/731 |
| 8,123,248 B2 | * | 2/2012 | Yamane | 280/739 |
| 2005/0098991 A1 | * | 5/2005 | Nagai et al. | 280/743.1 |
| 2006/0163848 A1 | | 7/2006 | Abe | |
| 2006/0186656 A1 | * | 8/2006 | Kumagai | 280/743.2 |

(Continued)

FOREIGN PATENT DOCUMENTS

| | | |
|---|---|---|
| JP | H0565706 U | 8/1993 |
| JP | 2000-071909 A | 3/2000 |

(Continued)

*Primary Examiner* — Paul N Dickson
*Assistant Examiner* — Darlene P Condra
(74) *Attorney, Agent, or Firm* — Dinsmore & Shohl LLP

(57) ABSTRACT

A vehicle occupant protection device includes a frontal collision airbag that is provided in front of a front seat, and inflates and deploys by gas being supplied into the airbag, and in which vent holes are provided in both a right side and a left side thereof; a frontal collision inflator that supplies the gas into the airbag by being activated; a discharge limiting portion capable of limiting a discharge of the gas from at least one vent hole, from among the left vent hole and the right vent hole; and a controller that activates the frontal collision inflator when a frontal collision is detected or predicted, and that controls the discharge limiting portion such that the discharge limiting portion limits the discharge of the gas from the one vent hole when a configuration of the frontal collision is an asymmetric collision on a side with the one vent hole.

12 Claims, 15 Drawing Sheets

(56) References Cited

U.S. PATENT DOCUMENTS

| | | | |
|---|---|---|---|
| 2006/0192370 A1* | 8/2006 | Abe et al. | 280/735 |
| 2008/0243343 A1 | 10/2008 | Kumagai et al. | |
| 2009/0224519 A1* | 9/2009 | Fukawatase et al. | 280/736 |
| 2009/0236837 A1 | 9/2009 | Fukawatase et al. | |
| 2010/0013197 A1* | 1/2010 | Adachi et al. | 280/728.1 |
| 2011/0254256 A1* | 10/2011 | Mendez et al. | 280/743.2 |
| 2011/0309605 A1* | 12/2011 | Kumagai | 280/741 |
| 2012/0306187 A1* | 12/2012 | Mendez et al. | 280/743.2 |

FOREIGN PATENT DOCUMENTS

| | | |
|---|---|---|
| JP | 2004-067005 A | 3/2004 |
| JP | 2006-205830 A | 8/2006 |
| JP | 2006-256508 A | 9/2006 |
| JP | 2008-044594 A | 2/2008 |
| JP | 2008-247277 A | 10/2008 |
| JP | 2009-227047 A | 10/2009 |
| JP | 2012-056371 A | 3/2012 |

* cited by examiner

VEHICLE OCCUPANT PROTECTION DEVICE

INCORPORATION BY REFERENCE

The disclosure of Japanese Patent Application No. 2013-173566 filed on Aug. 23, 2013 including the specification, drawings and abstract is incorporated herein by reference in its entirety.

BACKGROUND OF THE INVENTION

1. Field of the Invention

The invention relates to a vehicle occupant protection device that protects an occupant of a vehicle with an airbag.

2. Description of Related Art

In an airbag device for a driver's seat described in Japanese Utility Model Application Publication No. 5-65706 (JP 5-65706 U), an airbag is divided into a plurality of chambers in at least a vehicle width direction. Also, an inflator has a gas generating chamber that is divided into a plurality of gas generating chambers corresponding to the plurality of chambers of the airbag, such that gas is able to be distributed to each of the chambers. Also, the plurality of gas generating chambers of the inflator are selectively activated so as to inflate the airbag in a suitable deployment pattern according to the circumstances of a collision. As a result, an occupant is more accurately protected.

On the other hand, in an airbag device for a front passenger's seat described in Japanese Patent Application Publication No. 2006-256508 (JP 2006-256508 A), an airbag is divided into three air chambers in the lateral direction by partition walls. Also, inflators that supply gas into the air chambers are provided one for each air chamber. When a frontal collision occurs, all of the air chambers are activated, but when an oblique collision occurs, the air chamber on the side opposite the collision is not inflated or inflated at a lower pressure. As a result, the air chamber on the collision side is inflated relatively more than the other air chambers, so occupant protection performance in the case of an oblique collision is improved.

When the configuration of a frontal collision is an asymmetric collision such as an oblique collision, a so-called small overlap collision or the like, the time during which the vehicle body deforms is longer and the acceleration generated in the vehicle body is smaller than they are when a symmetrical collision such as a full-lap collision occurs. As a result, when an asymmetric collision occurs, the rate of forward movement of the head of the occupant is slower and the time during which impact phenomena are occurring is longer than they are when a symmetrical collision occurs.

SUMMARY OF THE INVENTION

The invention thus provides a vehicle occupant protection device capable of better protecting an occupant according to the collision configuration.

A first aspect of the invention relates to a vehicle occupant protection device. This vehicle occupant protection device includes a frontal collision airbag that is provided in front of a front seat, and inflates and deploys by gas being supplied into the frontal collision airbag, and in which vent holes are provided in both a right side and a left side thereof; a frontal collision inflator that supplies the gas into the frontal collision airbag by being activated; a discharge limiting portion capable of limiting a discharge of the gas from at least one vent hole, from among the left vent hole and the right vent hole; and a controller that activates the frontal collision inflator when a frontal collision is detected or predicted, and that controls the discharge limiting portion such that the discharge limiting portion limits the discharge of the gas from the one vent hole when a configuration of the frontal collision is an asymmetric collision on a side with the one vent hole.

In this aspect, the frontal collision inflator is activated when the controller detects or predicts a frontal collision. Then gas is supplied into the frontal collision airbag, and the frontal collision airbag inflates and deploys in front of the front seat. Here, when the configuration of the frontal collision is a symmetrical collision, the head of an occupant seated in the front seat strikes the frontal collision airbag at a higher rate of forward movement than in an asymmetric collision. At this time, gas is discharged from the left and right vent holes provided in the frontal collision airbag. As a result, the inertia energy of the head of the occupant is able to be absorbed quickly, so the load on the neck region of the occupant is able to be reduced.

On the other hand, when the configuration of the frontal collision is an asymmetric collision on a side where one of the vent holes, i.e., either the left or the right vent hole, is provided, the discharge of gas from the one vent hole is limited by the discharge limiting portion. As a result, the internal pressure on the side of the airbag where the one vent hole is provided will be higher than the internal pressure on the other side, so even if the head of the occupant strikes the side of the frontal collision airbag where the one vent hole is provided (i.e., the collision side) at an angle due to the impact of the asymmetric collision, the head of the occupant is able to be better received. Moreover, when this asymmetric collision occurs, the rate of forward movement of the head of the occupant is slower and the time during which collision phenomena are occurring is longer than they are when a symmetrical collision occurs. However, the discharge of the gas is limited as described above, so the time during which the head is restrained by the frontal collision airbag is able to be longer.

From this, according to the first aspect of the invention, the occupant is able to be better protected according to the collision configuration. The term "limit" in this aspect need only enable the effects described above to be obtained, and may include suppressing or inhibiting the discharge of gas from one vent hole, as well as completely blocking the discharge of gas from one vent hole.

A second aspect of the invention relates to a vehicle occupant protection device. This vehicle occupant protection device includes a frontal collision airbag that inflates and deploys toward a front of a front seat by gas being supplied into the frontal collision airbag, and that is provided with a vent hole; a frontal collision inflator capable of supplying the gas into the frontal collision airbag; a discharge limiting portion capable of limiting a discharge of the gas from the vent hole; and a controller that activates the frontal collision inflator when a frontal collision is detected or predicted, and that limits the discharge of the gas from the vent hole by the discharge limiting portion when a configuration of the frontal collision is an asymmetric collision.

In this aspect, the frontal collision inflator is activated when the controller detects or predicts a frontal collision. Then gas is supplied into the frontal collision airbag, and the frontal collision airbag inflates and deploys in front of the front seat. Here, when the configuration of the frontal collision is a symmetrical collision, the head of an occupant seated in the front seat strikes the frontal collision airbag at a higher rate of forward movement than in an asymmetric collision. At this time, gas is discharged from the vent hole provided in the frontal collision airbag. As a result, the inertia energy of the head of the occupant is able to be absorbed quickly, so the load on the neck region of the occupant is able to be reduced.

On the other hand, when the configuration of the frontal collision is an asymmetric collision, the discharge of gas from the vent hole is limited by the discharge limiting portion. When this asymmetric collision occurs, the rate of forward movement of the head of the occupant is slower and the time during which collision phenomena are occurring is longer than they are when a symmetrical collision occurs. However, the discharge of the gas is limited as described above, so the time during which the head is restrained by the frontal collision airbag is able to be longer.

From this, according to the second aspect of the invention, the occupant is able to be better protected according to the collision configuration. The term "limit" in this aspect need only enable the effects described above to be obtained, and may include suppressing or inhibiting the discharge of gas from the vent hole, as well as completely blocking the discharge of gas from the vent hole.

As described above, with the vehicle occupant protection device according to the first and second aspects of the invention, an occupant is able to be better protected according to the collision configuration.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<First Example Embodiment>

Figure 1:
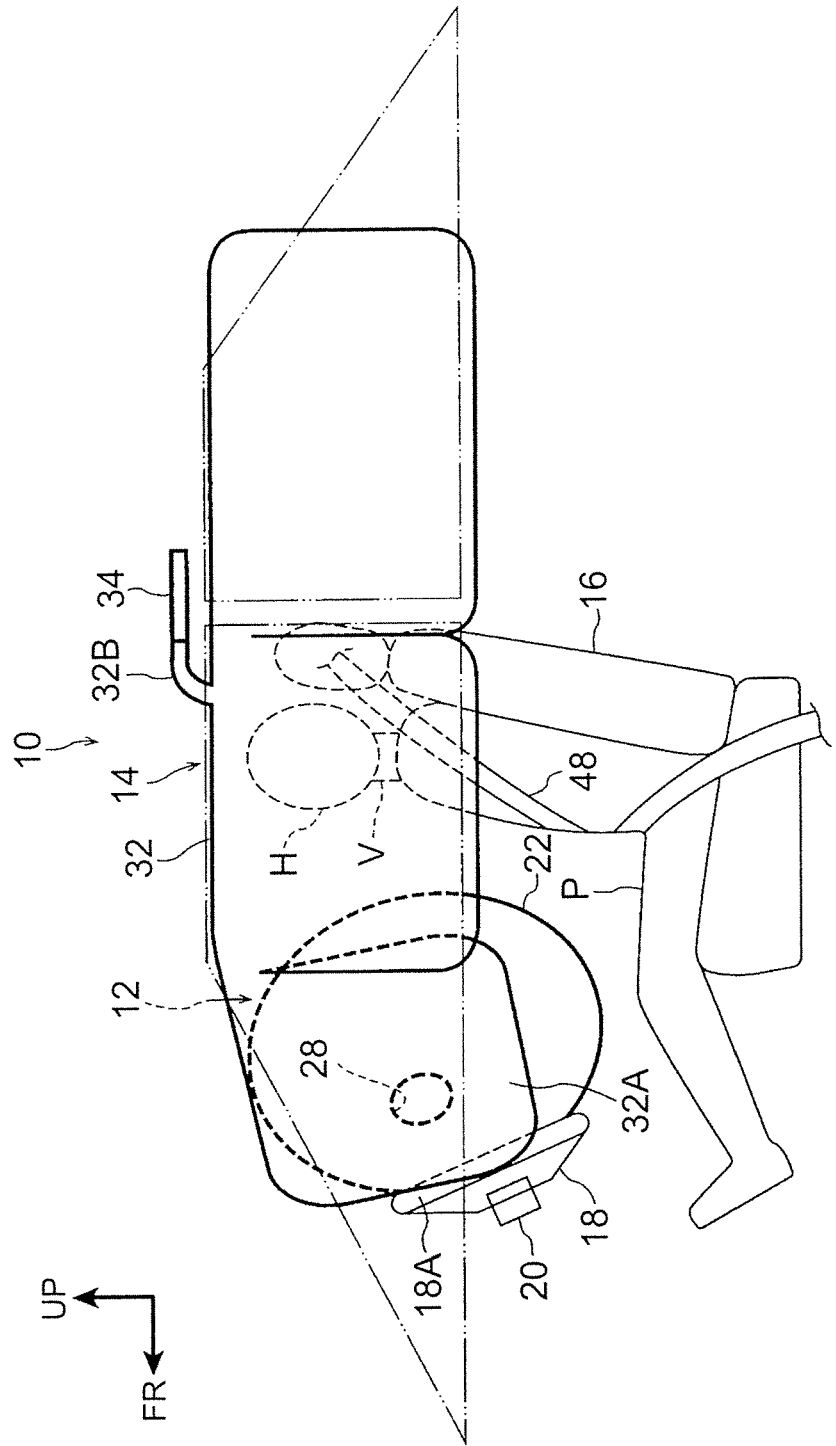
FIG. 1 is a side view schematically showing the peripheral structure including a vehicle occupant protection device according to a first example embodiment of the invention, when a driver airbag and a side collision curtain airbag are in an inflated and deployed state.
Figure 2:
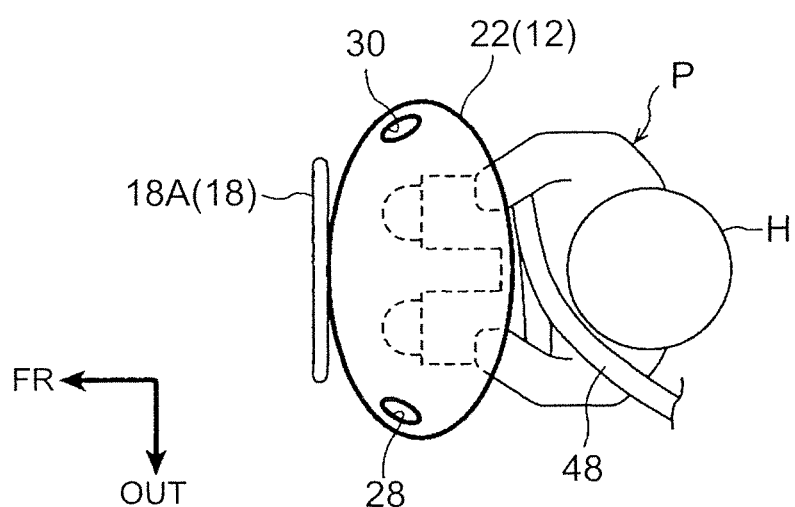
FIG. 2 is a plan view schematically showing the driver airbag according to the first example embodiment of the invention in an inflated and deployed state.

A vehicle occupant protection device 10 according to a first example embodiment of the invention will be described with reference to FIGS. 1 to 8. In the drawings, arrow FR indicates a forward direction (advancing direction) with respect to a vehicle, arrow UP indicates an upward direction with respect to the vehicle, and arrow OUT indicates an outside in a vehicle width direction. Hereinafter, unless otherwise specific, when directions of front and rear, up and down, and left and right are used, they will refer to front and rear in a vehicle longitudinal direction, left and right in a vehicle lateral direction (i.e., the vehicle width direction), and up and down in a vehicle up-and-down direction, respectively.

(Structure)

As shown in FIG. 1, the vehicle occupant protection device 10 according to this example embodiment includes a driver airbag device 12 that is an airbag device for a frontal collision, and a side collision curtain airbag device 14 that is an airbag device for a side collision.

Here, the driver airbag device 12 is mounted to a steering wheel 18 in front of a driver's seat 16 (a front seat) of a left-hand drive vehicle. This driver airbag device 12 has, as its main components, a frontal collision inflator 20 (i.e., a frontal collision gas generator) mounted to a center portion of the steering wheel 18, and a driver airbag 22 (i.e., a frontal collision airbag) that inflates and deploys toward the front of the driver's seat 16 by gas generated by the frontal collision inflator 20. The frontal collision inflator 20 is not shown in FIGS. 2, 4, and 5.

Figure 3:
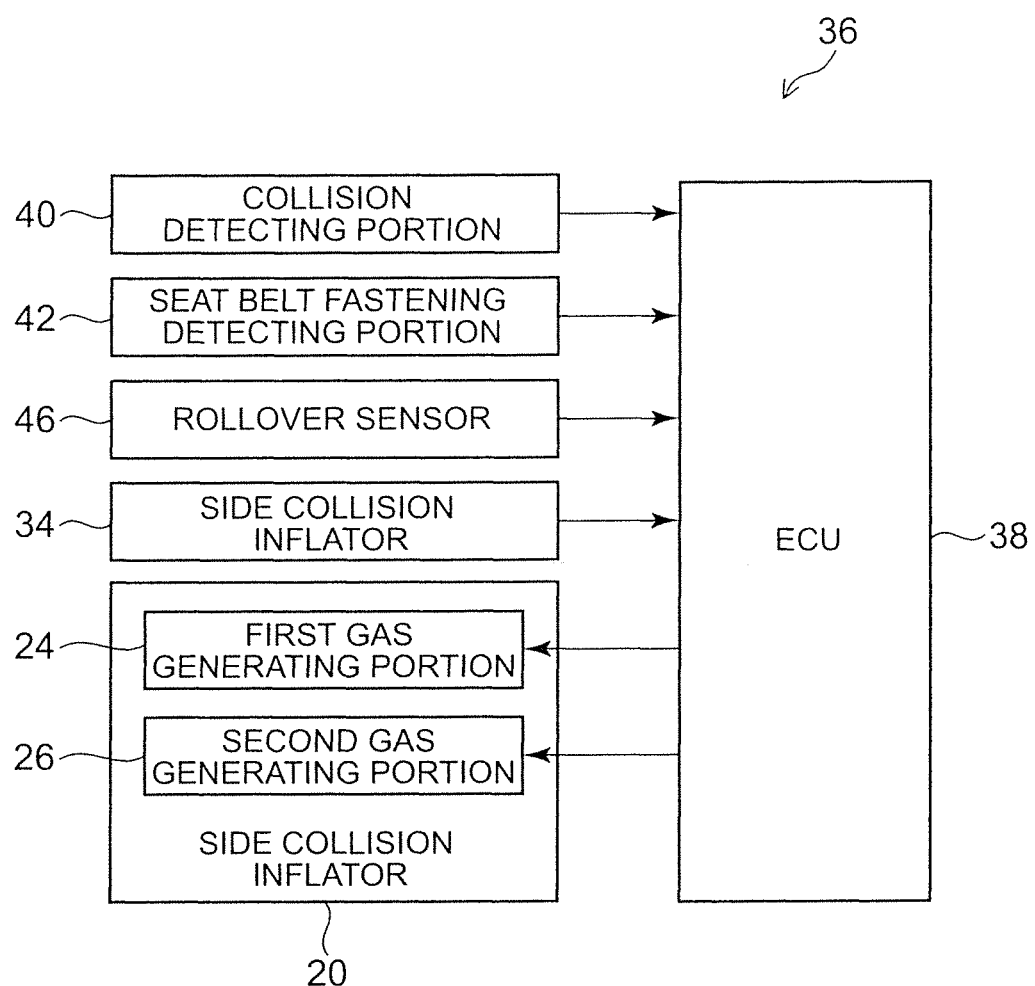
FIG. 3 is a block diagram of a controller included in the vehicle occupant protection device according to the first example embodiment of the invention.

The frontal collision inflator 20 is a two-stage ignition type inflator (a so-called dual mode inflator), and has a first gas generating portion 24 for the first stage and a second gas generating portion 26 for the second stage, as shown in FIG. 3. The first gas generating portion 24 and the second gas generating portion 26 are configured to generate gas individually by being activated.

The driver airbag 22 is formed in a bag shape by two pieces of base cloth formed of nylon or polyester cloth material, for example, being placed one on top of the other and an outer peripheral portion thereof being sewn. This driver airbag 22 is fixed to the center portion of the steering wheel 18 using the frontal collision inflator 20, and is inflated and deployed in a generally spherical shape that is larger than an outer diameter of a rim 18A of the steering wheel 18, by gas from the frontal collision inflator 20 being supplied into the driver airbag 22, and is supported from the side opposite the driver's seat 16 by the rim 18A. The driver airbag 22 is shown inflated and deployed in FIGS. 1, 2, 4, and 5.

A pair of left and right vent holes 28 and 30 (discharge ports) are provided in this driver airbag 22. These vent holes 28 and 30 are provided so as to be positioned on both the left and right sides (here both the left and right end portions) of the driver airbag 22 when the driver airbag 22 is inflated and deployed. These vent holes 28 and 30 are used to adjust the internal pressure of the driver airbag 22, by the gas that has been supplied into the driver airbag 22 being discharged out of the driver airbag 22 through the left and right vent holes 28 and 30. Hereinafter, the left vent hole 28 will be referred to as the "outside vent hole 28", and the right vent hole 30 will be referred to as the "inside vent hole 30".

The driver airbag 22 having this structure is normally folded up according to a predetermined folding method, and is covered together with the frontal collision inflator 20 by a wheel pad, not shown, that is attached to the center portion of the steering wheel 18.

Figure 4A:
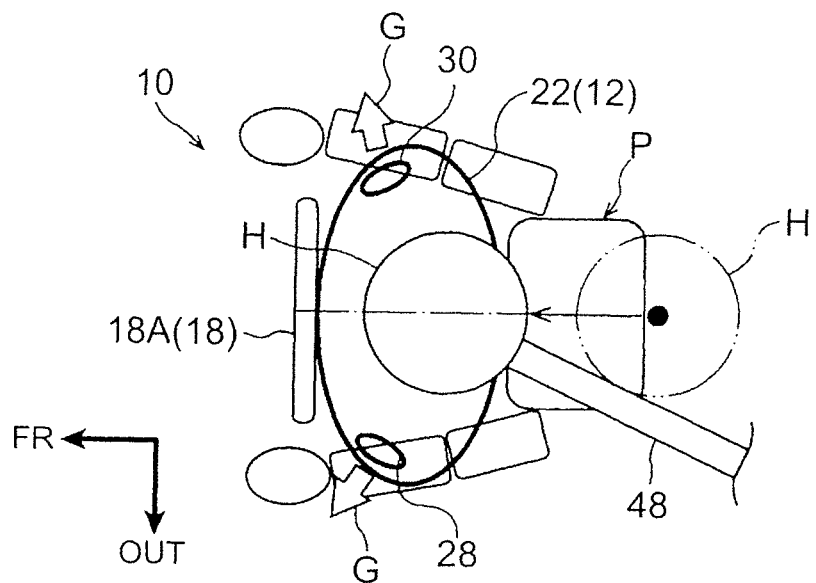
FIG. 4A is a plan view illustrating a situation in which a vehicle equipped with the vehicle occupant protection device according to the first example embodiment of the invention is involved in a symmetrical collision.
Figure 4B:
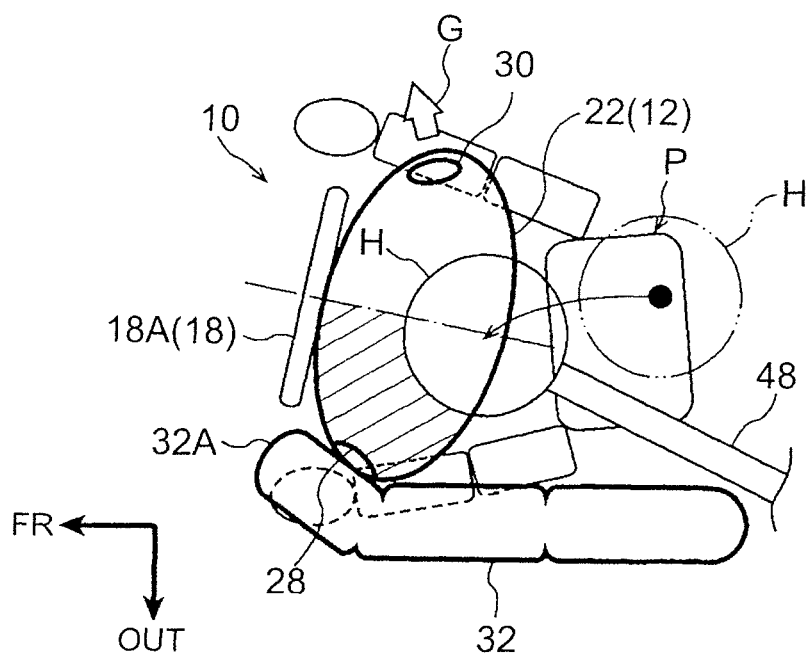
FIG. 4B is a plan view illustrating a situation in which the vehicle according to the first example embodiment of the invention is involved in an asymmetric collision on the left side.

Meanwhile, the side collision curtain airbag device 14 has, as its main components, a side collision curtain airbag 32 (hereinafter, referred to as "curtain airbag 32"), and a side collision inflator 34 (i.e., a side collision gas generator) that supplies gas into the curtain airbag 32, as shown in FIG. 1. In this example embodiment, the pair of left and right side collision curtain airbag devices 14 are provided on one each end portion in the vehicle width direction of a ceiling of a vehicle cabin, but in the drawings, the side collision curtain airbag device 14 on the right side of the vehicle is omitted. Also, in this example embodiment, the side collision curtain airbag device 14 on the left side of the vehicle (i.e., on the driver side) shown in FIGS. 1 and 4B is a structure member of the vehicle occupant protection device 10.

The curtain airbag 32 is formed in a long bag shape by basically the same manufacturing method as the driver airbag 22. This curtain airbag 32 is folded in a long shape according to a predetermined folding method (roll-folding in this case), and is arranged in a vehicle width direction end portion (here, between a roof side rail and a roof head railing, neither of which are shown) of the ceiling of the vehicle cabin. This curtain airbag 32 extends in the vehicle longitudinal direction in a state straddling a B pillar, between an A pillar and a C pillar, not shown. The side collision inflator 34 is connected cylindrical connecting portion 32B to a length direction intermediate portion of this curtain airbag 32.

The side collision inflator 34 is a cylinder type inflator, for example, and is fixed to the roof side rail in a state with an axial direction thereof headed along the vehicle longitudinal direction. When this side collision inflator 34 is activated, gas generated by the side collision inflator 34 is supplied into the curtain airbag 32. As a result, the curtain airbag 32 inflates and deploys in a curtain shape downward below the roof side rail, while bending a terminal portion of the roof head lining toward the vehicle cabin side.

With the side collision curtain airbag device 14 on the left side, which is a structure member of the vehicle occupant protection device 10, an inflation and deployment region of the curtain airbag 32 is set farther to the vehicle width direction outside than the inflation and deployment region of the driver airbag 22. A discharge limiting portion 32A that extends at an angle toward the vehicle width direction inside and the vehicle front side, as shown in FIG. 4B, is formed on a front end portion of the inflated and deployed curtain airbag 32. This discharge limiting portion 32A is formed so as to contact a portion of the driver airbag 22 where the outside vent hole 28 is formed, as well as the area therearound, when both the curtain airbag 32 and the driver airbag 22 are inflated and deployed. As a result, the outside vent hole 28 is closed off or becomes narrower (i.e., all or a portion of the outside vent hole 28 is blocked off), such that the discharge of gas from the outside vent hole 28 is limited.

The driver airbag device 12 and the side collision curtain airbag device 14 described above are provided with a controller 36 (see FIG. 3) for controlling the activation of these. This controller 36 has an ECU 38, a collision detecting portion 40, a seat belt fastening detecting portion 42, and a rollover sensor 46.

The collision detecting portion 40 includes, for example, a longitudinal acceleration sensor that detects acceleration in the longitudinal direction of the vehicle, and a lateral acceleration sensor that detects acceleration in the lateral direction of the vehicle. The collision detecting portion 40 detects the collision configuration of the vehicle, and the severity and the like of the collision, and outputs the detection results to the ECU 38.

The seat belt fastening detecting portion 42 is formed by a switch or the like that detects a connection state between a buckle and a tongue provided on a three point seatbelt 48 fastened around an occupant P seated in the driver's seat 16. This seat belt fastening detecting portion 42 detects whether the seatbelt 48 is fastened around the occupant P, and outputs the detection result to the ECU 38.

The rollover sensor 46 includes a gyro and the like, and detects the posture of the vehicle, e.g., the inclination angle (roll angle) of the vehicle about an axis in which the vehicle longitudinal direction is the axial direction, and a rotation angular velocity (roll rate) about an axis in which the vehicle longitudinal direction is the axial direction. The rollover sensor 46 then outputs a signal indicative of a level corresponding to the posture of the vehicle to the ECU 38. The ECU 38 then detects a rollover state of the vehicle based on the signal from the rollover sensor 46.

The ECU 38 controls the activation of the driver airbag device 12 and the left and right side collision curtain airbag devices 14 based on the signals from the seat belt fastening detecting portion 42 and the rollover sensor 46. Hereinafter, this control method will be described.

When a side collision is detected based on the signal from the collision detecting portion 40, the ECU 38 activates the side collision inflator 34 of the side collision curtain airbag device 14 on the collision side (either the left side or the right side). Also, when a rollover is detected based on the signal from the rollover sensor 46, the ECU 38 activates the side collision inflator 34 of the side collision curtain airbag device 14 on both the left and right sides.

Also, when a frontal collision is detected based on the signal from the collision detecting portion 40, the ECU 38 determines whether the configuration of the frontal collision is a symmetrical collision or an asymmetric collision. The symmetrical collision includes a full lap frontal collision (i.e., a full frontal collision), and case in which a colliding object that is vertically long such as a utility pole collides with a vehicle width direction center portion at the front of the vehicle body. Also, the asymmetric collision includes an offset collision, a small overlap collision, and an oblique collision. Table 1 below shows the deployment setting of each airbag in a symmetrical collision and an asymmetric collision.

TABLE 1

| | | Driver side curtain airbag | | | |
| --- | --- | --- | --- | --- | --- |
| | | Symmetrical collision Not deployed | Offset collision (driver side) Deployed | Small overlap collision (driver side) Deployed | Oblique collision (driver side) Deployed |
| Driver airbag | Inside vent hole | Open | Open | Open | Open |
| | Outside vent hole | Open | Closed | Closed | Closed |

When the detection result by the ECU 38 is a symmetrical collision, the ECU 38 activates the frontal collision inflator 20, but does not activate the side collision inflator 34. In this case, the ECU 38 determines the severity of the collision and the seatbelt fastening state of the occupant P based on signals from the collision detecting portion 40 and the seat belt fastening detecting portion 42, and controls each activation (ignition) timing of the first gas generating portion 24 and the second gas generating portion 26.

For example, when the occupant has fastened the seatbelt 48, or when an acceleration in the longitudinal direction of the vehicle at the time of collision is less than a predetermined value (i.e., when a minor collision has occurred), the second gas generating portion 26 is ignited as a second stage after a predetermined period of time has passed after the first gas generating portion 24 is ignited as a first stage (i.e., a so-called delayed ignition is performed). As a result, the deployment rate of the driver airbag 22 is slowed and the length of time for which the internal pressure of the driver airbag 22 is maintained is lengthened. Also, for example, when the occupant has not fastened the seatbelt 48, or when the acceleration in the longitudinal direction of the vehicle at the time of collision is equal to or greater than the predetermined value, the first gas generating portion 24 and the second gas generating portion 26 are ignited simultaneously. As a result, the driver airbag 22 is promptly inflated and deployed.

On the other hand, when the detection result described above is an asymmetric collision, the ECU 38 determines whether the asymmetric collision has occurred on the left side or the right side. If it is determined that the asymmetric collision has occurred on the left side (i.e., the driver's seat 16 side), the ECU 38 activates the frontal collision inflator 20, as well as activates the side collision inflator 34 of the side collision curtain airbag device 14 on the left side (i.e., the collision side). In this case as well, the ECU 38 performs the delayed ignition described above on the frontal collision inflator 20. Also at this time, the ECU 38 ignites the side collision inflator 34 at least later than the first gas generating portion 24. More specifically, the ECU 38 ignites the side collision inflator 34 after a predetermined period of time has elapsed after igniting the first gas generating portion 24.

When a pre-crash sensor that predicts a frontal collision or a side collision is connected to the ECU 38, the frontal collision inflator 20 and the side collision inflator 34 may be appropriately activated when the ECU 38 has predicted a frontal collision or a side collision based on a signal from the pre-crash sensor.

Also, when the collision detecting portion 40 includes a pair of left and right longitudinal acceleration sensors mounted to left and right front side members or the like, the ECU 38 may distinguish between a symmetrical collision and an asymmetric collision by comparing a gap in the timing at which signals are input from the left and right longitudinal acceleration sensors, and the magnitude of the signals output from the longitudinal acceleration sensors.

(Operation and Effects)

Next, the operation and effects of this first example embodiment will be described.

With the vehicle occupant protection device 10 having the structure described above, when the ECU 38 detects or predicts a frontal collision, the frontal collision inflator 20 is activated. Then gas is supplied into the driver airbag 22, and the driver airbag 22 inflates and deploys in the front of the driver's seat 16.

Here, when the configuration of the frontal collision is a symmetrical collision, a head H of the occupant P seated in the driver's seat 16 strikes the driver airbag 22 at a higher rate of forward movement than in an asymmetric collision. At this time, gas G is discharged from both the outside vent hole 28 and the inside vent hole 30 of the driver airbag 22, as shown in FIG. 4A, because the side collision curtain airbag 32 is not inflated and deployed. As a result, inertia energy of the head H of the occupant P is able to be absorbed quickly, so the load on the neck region V of the occupant P is able to be reduced.

On the other hand, when the configuration of the frontal collision is an asymmetric collision on the left side (i.e., the driver's seat 16 side), the ECU 38 activates the frontal collision inflator 20 and the side collision inflator 34 on the left side. Then gas is supplied into the driver airbag 22, and the driver airbag 22 inflates and deploys in front of the driver's seat 16, while gas is also supplied into the left side curtain airbag 32 and the left side curtain airbag 32 inflates and deploys toward the vehicle width direction outside of the driver airbag 22 (the state shown in FIG. 4B). In this state, a discharge limiting portion 32A of the left side curtain airbag 32 contacts the portion of the driver airbag 22 where the outside vent hole 28 is formed, as well as the area therearound. As a result, the discharge of gas G from the outside vent hole 28 in the driver airbag 22 is limited.

As a result, the internal pressure on the left side (i.e., the vehicle width direction outside) of the driver airbag 22 becomes higher than the internal pressure on the right side (i.e., the vehicle width direction inside), so even if the head H of the occupant P strikes a left side portion of the driver airbag 22 at an angle due to the impact of an asymmetric collision, the head H is able to be better received. In FIG. 4B, the left side portion of the driver airbag 22 where the internal pressure is high is indicated by hatching to facilitate understanding.

Also, when an asymmetric collision occurs, the rate of forward movement of the head H is slower and the time during which collision phenomena are occurring is longer than they are when a symmetrical collision occurs. However, the discharge of the gas G is limited as described above, so the time during which the head H is restrained by the driver airbag 22 is able to be longer. Therefore, with the example embodiment described above, the occupant P is able to be better protected according to the collision configuration.

Figure 5A:
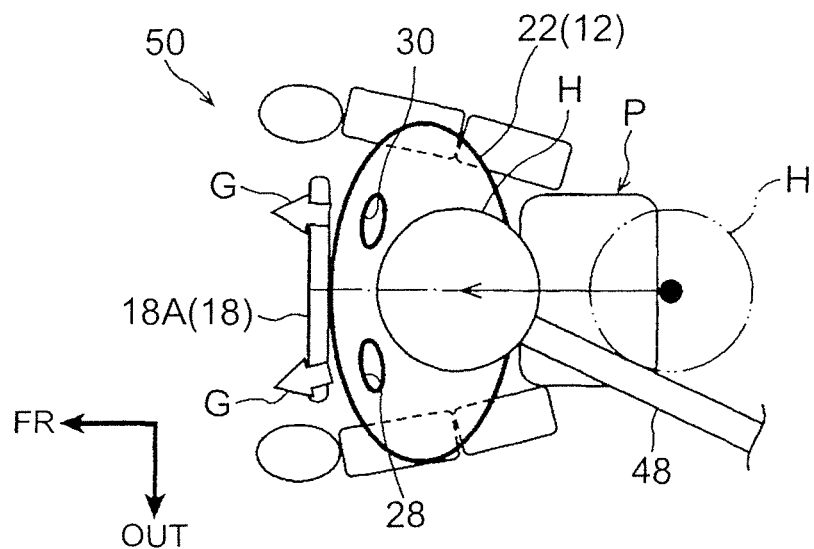
FIG. 5A is a plan view illustrating a situation in which a vehicle according to a comparative example is involved in a symmetrical collision.
Figure 5B:
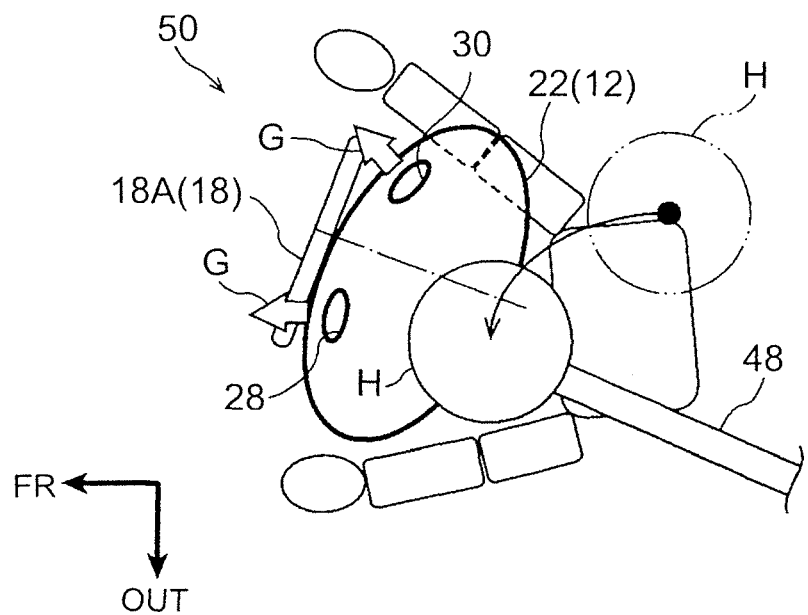
FIG. 5B is a plan view illustrating a situation in which the vehicle according to the comparative example is involved in an asymmetric collision on the left side.

The effects described above will be described in more detail using a comparative example 50 shown in FIGS. 5A and 5B. With this comparative example 50, when a symmetrical collision shown in FIG. 5A occurs, effects similar to those of the example embodiment are able to be obtained by gas G being discharged from the outside vent hole 28 and the inside vent hole 30. However, when an asymmetric collision on the driver side shown in FIG. 5B occurs, the discharge of gas G from the outside vent hole 28 in the driver airbag 22 is not limited, so the length of time for which the head H is restrained by the driver airbag 22 (i.e., the length of time during which forward movement of the head H decelerates) is shorter.

Also, the driver airbag 22 is mounted to the center portion of the steering wheel 18, and is thus supported by a mounting portion thereof and the rim 18A of the steering wheel 18 while inflated and deployed. Therefore, when an asymmetric collision in which a load is applied from the head H farther outward than the rim 18A of the driver airbag 22 occurs, there is a possibility that the driver airbag 22 will incline toward the vehicle width direction outside, as shown in FIG. 5B.

One possible way to solve this kind of problem is to inhibit the discharge of gas G by reducing the size of the vent holes 28 and 30, for example. However, with this type of structure, it would be difficult to ensure neck region protection performance when a symmetrical collision occurs. Regarding this, in this example embodiment, the discharge of gas G from the outside vent hole 28 is allowed by having the curtain airbag 32 not inflate and deploy when a symmetrical collision occurs, while the discharge of gas G from the outside vent hole 28 is able to be limited by the curtain airbag 32 when an asymmetric collision on the driver side occurs. This enables the type of problem described above to be solved.

Figure 6:
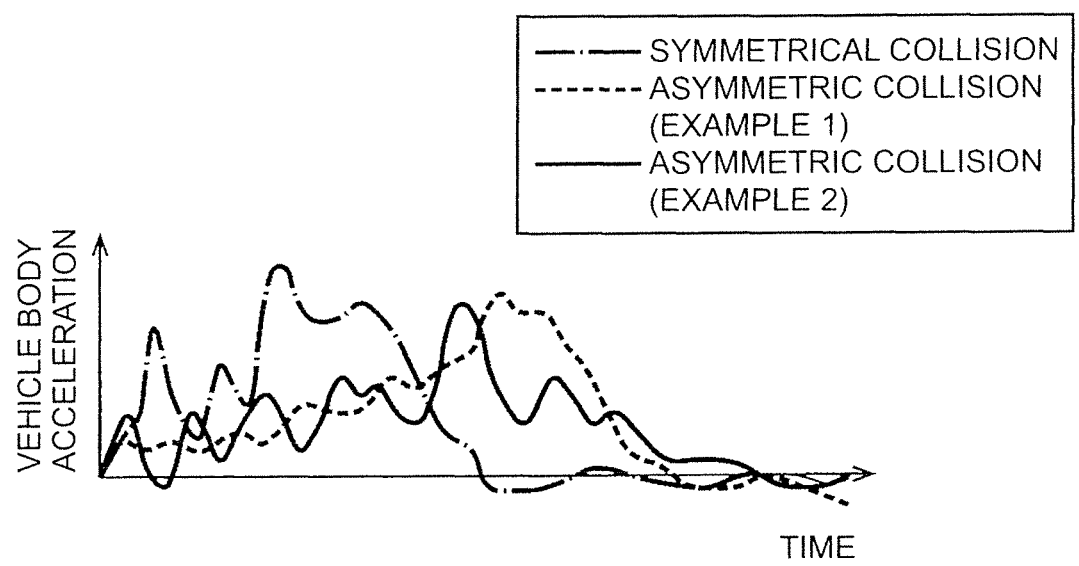
FIG. 6 is a chart showing the relationship between time and acceleration of a vehicle body when a frontal collision occurs.
Figure 7:
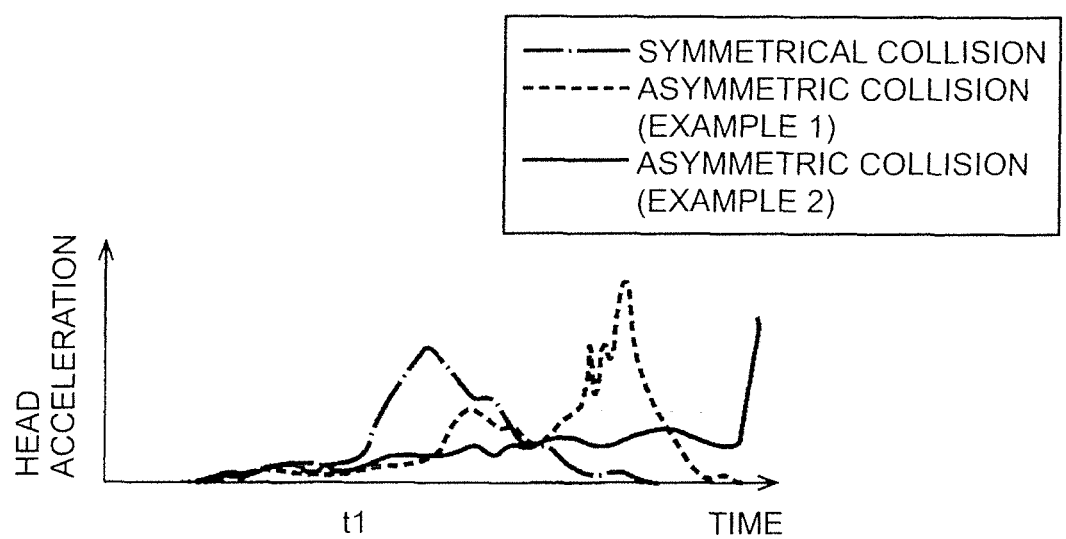
FIG. 7 is a chart showing the relationship between time and acceleration of a head of an occupant when a frontal collision occurs.
Figure 8:
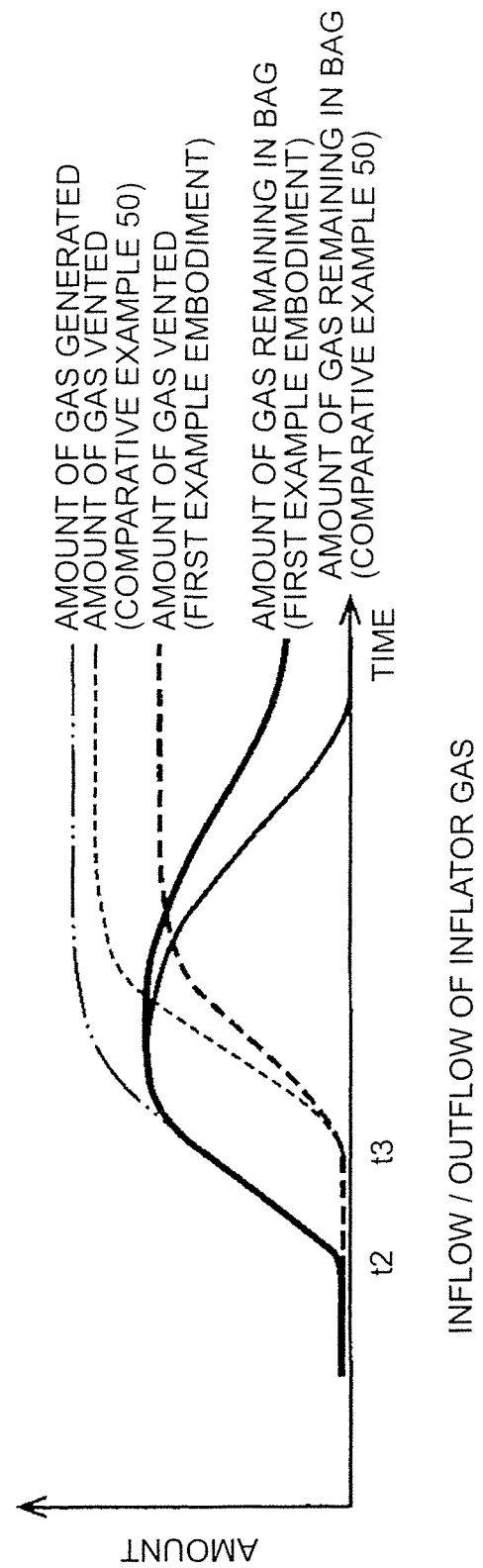
FIG. 8 is a chart showing the relationship between a gas inflow amount and a gas outflow amount of a driver airbag when an asymmetric collision occurs, for both the first example embodiment of the invention and the comparative example.

FIG. 6 is a chart showing the relationship between time and acceleration of a vehicle body when a frontal collision occurs. Also, FIG. 7 is a chart showing the relationship between time and acceleration of a head of an occupant when a frontal collision occurs. Further, FIG. 8 is a chart showing the relationship between a gas inflow amount and a gas outflow amount of a driver airbag when an asymmetric collision occurs, for both the first example embodiment of the invention and the comparative example 50. Time t1 in FIG. 7 indicates a point at which the head starts to be restrained by the driver airbag. Also, time t2 in FIG. 8 indicates a point at which the first gas generating portion 24 of the frontal collision inflator 20 ignites, and time t3 indicates a point at which gas starts to be discharged from the driver airbag 22.

As shown in FIG. 6, when an asymmetric collision indicated by the broken line and the solid line occurs, the timing at which the acceleration of the vehicle body peaks is later than it is when a symmetrical collision indicated by the alternate long and short dash line occurs. As a result, when an asymmetric collision indicated by the broken line and the solid line occurs, the timing at which the acceleration of the head of the occupant peaks is also later than it is when a symmetrical collision indicated by the alternate long and short dash line occurs, as shown in FIG. 7, so the time during which collision phenomena occur becomes longer.

In view of this situation, in this example embodiment, the amount of gas remaining in the driver airbag 22 in the latter half of the collision increases because less gas is vented from the driver airbag 22 compared to the comparative example 50, as shown in FIG. 8. As a result, the head protection performance when an asymmetric collision occurs is able to be improved.

Moreover, in this example embodiment, the driver airbag 22 is able to be supported from the vehicle width direction outside by the curtain airbag 32, so the driver airbag 22 is able to be inhibited from inclining toward the vehicle width direction outside due to the impact when the head H of the occupant P strikes the driver airbag 22. Also, when a small overlap collision on the driver side occurs, the head H of the occupant P is displaced at an angle toward the A pillar on the driver side where it is highly likely that an impact load will be transmitted, but in this example embodiment, the head H is able to be better protected by the driver airbag 22 and the driver side curtain airbag 32. Furthermore, a known side collision curtain airbag device 14 can be used as the structural material of the discharge limiting portion, so costs are also able to be reduced.

Also, when an asymmetric collision occurs, the timing at which the head H of the occupant P strikes the driver airbag 22 is later than it is when a symmetrical collision occurs, so in this example embodiment, the discharge of gas from the outside vent hole 28 in the driver airbag 22 is able to be limited according to the timing at which the head of the occupant strikes the driver airbag 22. That is, the ECU 38 ignites the side collision inflator 34 on the driver side later than the first gas generating portion 24 of the frontal collision inflator 20. As a result, the driver side curtain airbag 32 is able to be inflated and deployed later than the driver airbag 22, so the discharge limiting portion 32A is able to contact the portion of the driver airbag 22 where the outside vent hole 28 is formed when the head H strikes the driver airbag 22. As a result, the time for which the internal pressure of the driver side curtain airbag 32 is maintained is able to be staggered, so the discharge of gas from the outside vent hole 28 is able to be effectively limited.

Moreover, in this example embodiment, when the configuration of a frontal collision is an asymmetric collision, first gas from the first gas generating portion 24 of the frontal collision inflator 20 is supplied into the driver airbag 22, such that the driver airbag 22 inflates and deploys. Then the gas from the second gas generating portion 26 of the inflator is supplied into the driver airbag 22. Consequently, the length of time for which the internal pressure of the driver airbag 22 is maintained is able to be lengthened. As a result, the head H is able to be effectively protected when an asymmetric collision in which the timing at which the head H of the occupant P strikes the driver airbag 22 is later occurs.

Next, another example embodiment of the invention will be described. The basic structure and operation that are similar to that of the first example embodiment will be denoted by the same reference characters as those used in the first example embodiment, and descriptions of this structure and operation will be omitted.

<Second Example Embodiment>

Figure 9:
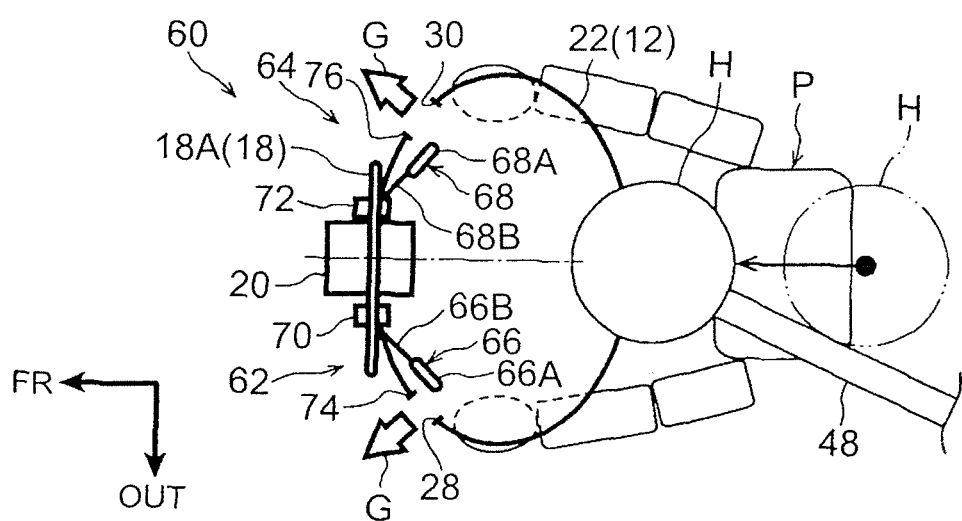
FIG. 9 is a top sectional view schematically showing the structure of the main portions of a vehicle occupant protection device according to a second example embodiment of the invention, and illustrating a situation when a symmetrical collision occurs.
Figure 10:
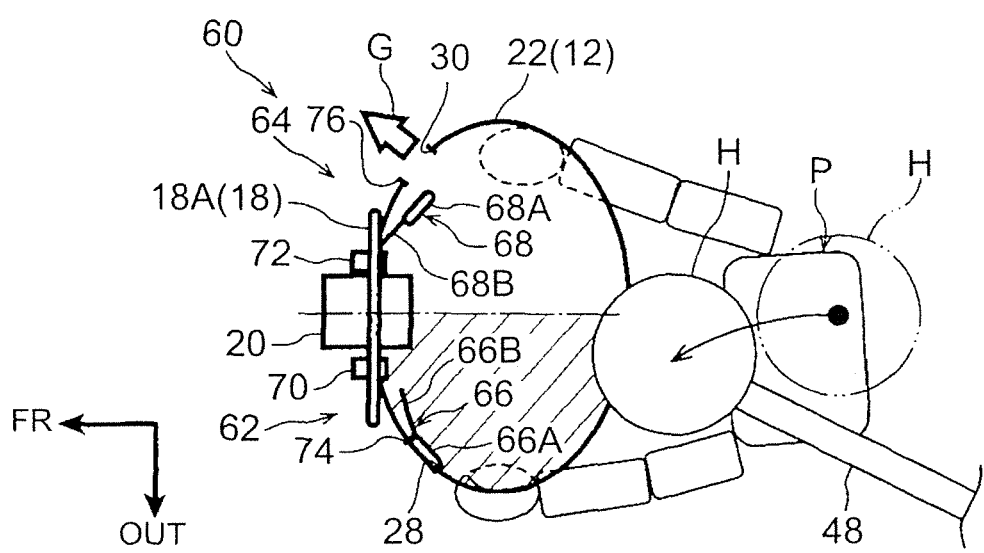
FIG. 10 is a plan view corresponding to FIG. 9, illustrating a situation when an asymmetric collision on the left side occurs.
Figure 11:
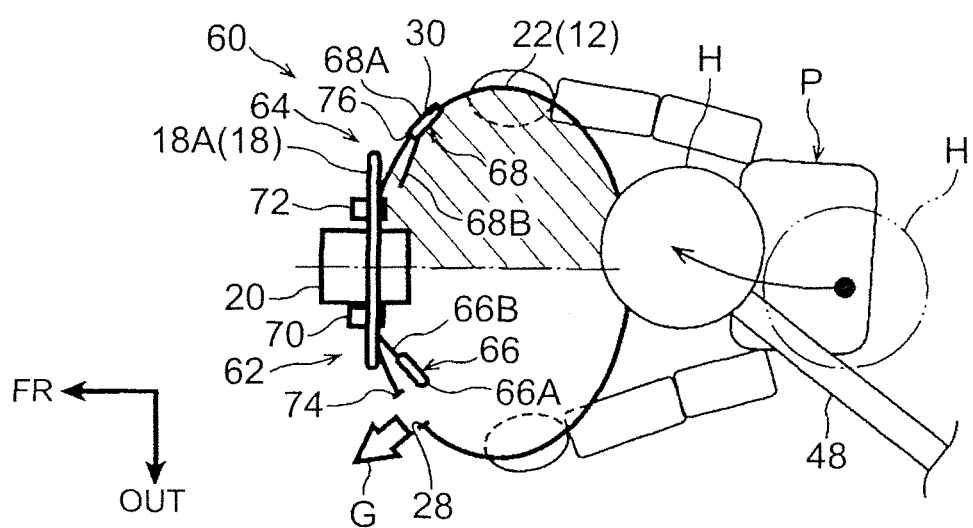
FIG. 11 is a plan view corresponding to FIG. 9, illustrating a situation when an asymmetric collision on the right side occurs.

FIGS. 9 to 11 are top sectional views schematically showing the structure of the main portions of a vehicle occupant protection device 60 according to a second example embodiment of the invention. This vehicle occupant protection device 60 is not configured to limit the discharge of gas from the outside vent hole 28 by the side collision curtain airbag 32 as in the first example embodiment. This vehicle occupant protection device 60 is configured to open and close the outside vent hole 28 (hereinafter referred to as the "left vent hole 28") and the inside vent hole 30 (hereinafter referred to as the "right vent hole 30") by a pair of left and right opening and closing mechanisms 62 and 64, respectively.

The left and right opening and closing mechanisms 62 and 64 include a left closing member 66 that closes the left vent hole 28, a right closing member 68 that closes the right vent hole 30, a left micro gas generator 70 (hereinafter referred to as the "left MMG 70") to which the left closing member 66 is connected, and a right micro gas generator 72 (hereinafter referred to as the "right MMG 72") to which the right closing member 68 is connected.

Figure 12:
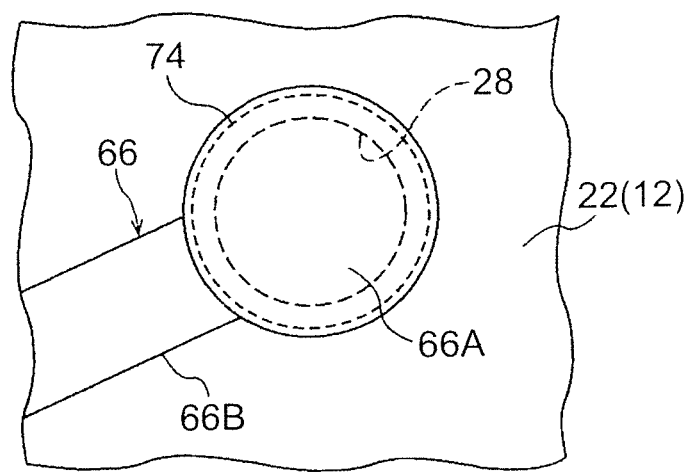
FIG. 12 is an enlarged view of an area around an outer vent hole of a driver airbag provided in the vehicle occupant protection device according to the second example embodiment of the invention.

The left closing member 66 is made of the same cloth as the base cloth of the driver airbag 22, and includes a closing portion 66A (i.e., a discharge limiting portion) formed in a circular shape that is slightly larger than the left vent hole 28, as shown in FIG. 12. This closing portion 66A is sewn to a hole edge portion of the left vent hole 28 by a weak sewn portion 74 (i.e., a tear seam), and closes off the left vent hole 28. A strip-shaped belt portion 66B extends from this closing portion 66A. A tip end portion of this belt portion 66B is connected to a left MMG 70 fixed to the center side of the steering wheel 18. This left MMG 70 has a through-hole through which the tip end side of the belt portion 66B passes. When the left MMG 70 is activated, it cuts a tip end side of the belt portion 66B.

The right closing member 68 has a closing portion 68A (i.e., a discharge limiting portion) and a belt portion 68B, similar to the left closing member 66. The closing portion 68A of the right closing member 68 is sewn to a hole edge portion of the right vent hole 30 by a weak sewn portion 76 (i.e., a tear seam), and closes off the right vent hole 30. Also, the belt portion 68B of the right closing member 68 is connected to the right MMG 72 that is fixed to the center side of the steering wheel 18. This right MMG 72 is structured similar to the left MMG 70, and when activated, cuts a tip end side of the belt portion 68B of the right closing member 68.

The left MMG 70 and the right MMG 72 are connected to the ECU 38. The ECU 38 controls left and right opening mechanisms to open the left and right vent holes when a symmetrical collision is detected. That is, the ECU 38 activates the frontal collision inflator 20. As a result, the driver airbag 22 inflates and deploys, but at this time, the length dimensions of the left closing member 66 and the right closing member 68 are set short so that the left and right sewn portions 74 and 76 tear. That is, the left closing member 66 and the right closing member 68 expand by the inflation and deployment of the driver airbag 22, and as a result, a tear load is applied to the left and right sewn portions 74 and 76. When the left and right sewn portions 74 and 76 tear, the left and right vent holes 28 and 30 open, as shown in FIG. 9.

On the other hand, when the ECU 38 detects an asymmetric collision on the left side, the ECU 38 controls the left and right opening mechanisms to open the vent hole on the side opposite the collision, and close the vent hole on the collision side. That is, the ECU 38 activates the frontal collision inflator 20 as well as activates the left MMG 70'. As a result, the belt portion 66B of the left closing member 66 is cut, and the driver airbag 22 inflates and deploys, as shown in FIG. 10. In this case, the left sewn portion 74 does not tear, only the right sewn portion 76 tears. As a result, only the right vent hole 30 opens.

Also, when the ECU 38 detects an asymmetric collision on the right side on the other hand, the ECU 38 activates the frontal collision inflator 20 as well as activates the right MMG 72. As a result, the belt portion 68B of the right closing member 68 is cut, and the driver airbag 22 inflates and deploys, as shown in FIG. 11. In this case, the right sewn portion 76 does not tear, only the left sewn portion 74 tears. As a result, only the left vent hole 28 opens. In this example embodiment, structure other than that described above is the same as it is in the first example embodiment.

In this example embodiment, when a symmetrical collision occurs, the left and right vent holes 28 and 30 open, just as in the first example embodiment described above, so the same effects as those of the first example embodiment are able to be obtained. Also, when the configuration of a frontal collision is an asymmetric collision on the left side, only the right vent hole 30 opens, so the internal pressure on the left side (i.e., on the vehicle width direction outside) of the driver airbag 22 becomes higher than the internal pressure on the right side (i.e., on the vehicle width direction inside). Therefore, in this case as well, the same effects as those of the first example embodiment are able to be obtained.

Moreover, in this example embodiment, when the configuration of a Frontal collision is an asymmetric collision on the right side, only the left vent hole 28 opens. As a result, the internal pressure on the right side (i.e., on the vehicle width direction inside) of the driver airbag 22 becomes higher than the internal pressure on the left side (i.e., on the vehicle width direction outside), so even if the head H of the occupant P strikes a right side portion of the driver airbag 22 at an angle due to the impact of an asymmetric collision, the head H is able to be better received. Also, the length of time for which the head H is restrained by the driver airbag 22 is able to be lengthened by the discharge of gas G from the right vent hole 30 being limited. In FIGS. 10 and 11, the portion where the internal pressure in the driver airbag 22 is high is indicated by hatching to facilitate understanding.

In this way, in this example embodiment, a dedicated opening and closing mechanism is provided for each of the left and right vent holes 28 and 30, so if an asymmetric collision occurs on either the right or the left side, the vent hole on the side opposite the collision is able to open and the vent hole on the collision side is able to close. Also, in this example embodiment, the left and right vent holes 28 and 30 are able to be opened and closed independently, so the open/closed states of the left and right vent holes 28 and 30 are able to be appropriately switched based on whether the seat belt of the occupant P is fastened as detected by the seat belt fastening detecting portion 42, and the severity of the collision as detected by the collision detecting portion 40, and the like.

With the left and right opening and closing mechanisms 62 and 64 according to the second example embodiment described above, the belt portions 66B and 68B of the left and right closing members 66 and 68 are appropriately cut by the left and right MMGs 70 and 72, but the invention is not limited to this. That is, a variety of known technology may be applied to the structure of the left and right opening and closing mechanisms. For example, the left and right vent holes 28 and 30 may also be appropriately opened by suitably pulling the belt portions 66B and 68B of the left and right closing members 66 and 68 by the left and right MMGs 70 and 72.

In this case, when the ECU 38 inflates and deploys the driver airbag 22 in response to detecting a symmetrical collision, the ECU 38 may control the left and right MMGs 70 and 72 such that the left and right vent holes 28 and 30 are open, closed, or opened after being closed, based on detection results from the collision detecting portion 40 and the seat belt fastening detecting portion 42, for example.

<Third Example Embodiment>

Figure 13:
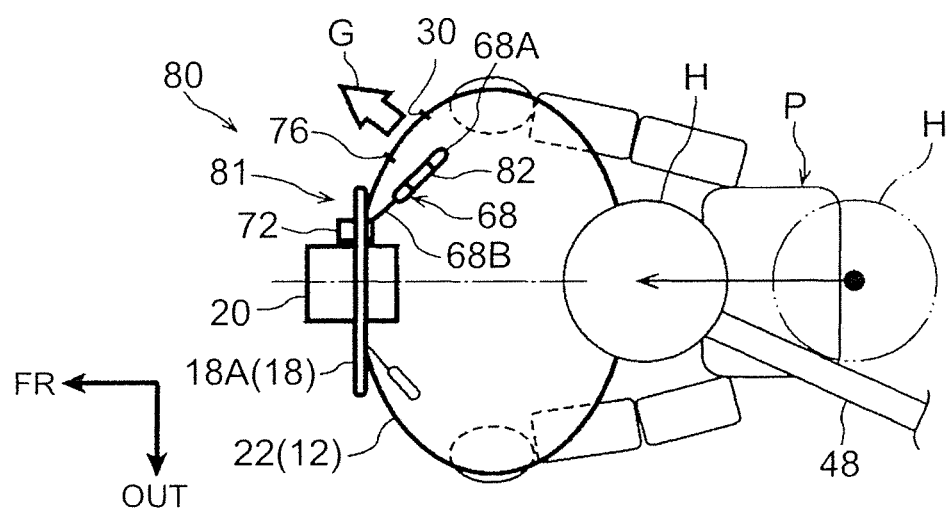
FIG. 13 is a top sectional view schematically showing the structure of the main portions of a vehicle occupant protection device according to a third example embodiment of the invention, and illustrating a situation when a symmetrical collision occurs.
Figure 14:
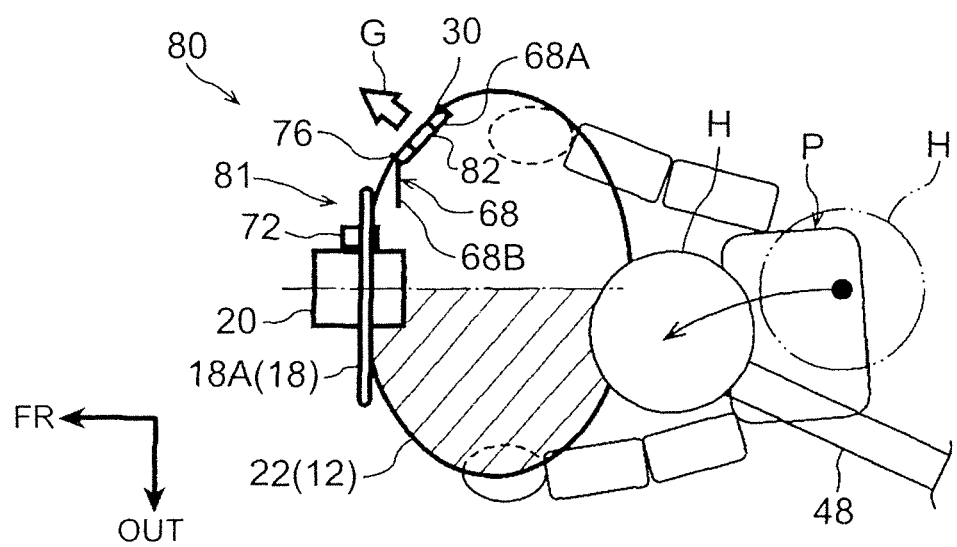
FIG. 14 is a plan view corresponding to FIG. 13, illustrating a situation when an asymmetric collision on the left side occurs.
Figure 15:
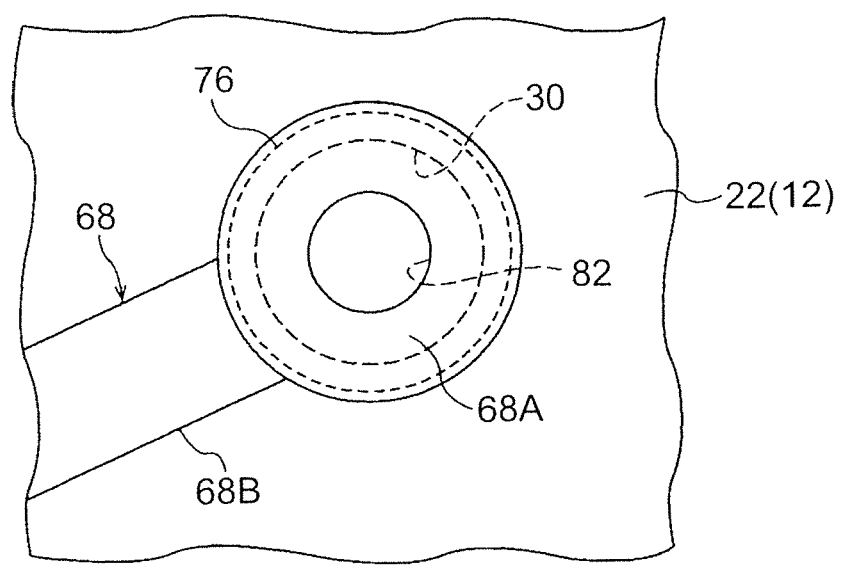
FIG. 15 is an enlarged view of an area around an inner vent hole of a driver airbag provided in the vehicle occupant protection device according to the third example embodiment of the invention.

FIGS. 13 and 14 are top sectional views schematically showing the structure of the main portions of a vehicle occupant protection device 80 according to a third example embodiment of the invention. With the driver airbag 22 of this vehicle occupant protection device 80, the left vent hole 28 is omitted, and the right vent hole 30 is formed with a larger diameter than in the example embodiments described above. Also, this vehicle occupant protection device 80 includes an opening and closing mechanism 81 capable of opening and closing the right vent hole 30. This opening and closing mechanism 81 has basically the same structure as the opening and closing mechanism 64 according to the second example embodiment described above, and includes the right closing member 68 (hereinafter simply referred to as "closing member 68") that is connected to the right MMG 72 (hereinafter simply referred to as "MMG 72"). However, with this closing member 68, a small diameter vent hole 82 formed with a smaller diameter than the vent hole 30, is formed in the closing portion 68A that closes the vent hole 30.

In this example embodiment, the ECU 38 activates the frontal collision inflator 20 upon detecting a symmetrical collision. Therefore, when the driver airbag 22 inflates and deploys, the closing member 68 expands and the sewn portion 76 tears. As a result, the vent hole 30 opens, as shown in FIG. 13. This vent hole 30 is formed with a larger diameter than in the first example embodiment, so gas G inside the driver airbag 22 is able be better discharged. Consequently, the inertia energy of the head H of the occupant P is able to be quickly absorbed, so the load on the neck region V of the occupant P is able to be reduced.

Meanwhile, when the ECU 38 detects an asymmetric collision on the left side or the right side, the ECU 38 activates the frontal collision inflator 20 and also activates the MMG 72. As a result, the belt portion 68B of the closing member 68 is cut and the driver airbag 22 inflates and deploys. In this case, the sewn portion 76 does not tear, so the closing portion 68A of the closing member 68 remains sewn to the driver airbag 22 at the sewn portion 76, but even in this state, the discharge of gas G from the small diameter vent hole 82 is allowed (see FIG. 14). However, this small diameter vent hole 82 is formed with a smaller diameter than the vent hole 30, so the discharge of gas G from the driver airbag 22 is able to be suppressed. As a result, the length time for which the internal pressure of the driver airbag 22 is maintained is able to be increased, so the length of time for which the head H is restrained by the driver airbag 22 is able to be increased. Accordingly, in this example embodiment as well, the occupant P is able to be better protected according to the collision configuration.

In each of the example embodiments described above, the frontal collision airbag is the driver airbag 22, but the invention is not limited to this. That is, the frontal collision airbag may also be a front passenger airbag.

Also, in the first example embodiment described above, the discharge limiting portion includes the side collision curtain airbag 32 and the side collision inflator 34, but the invention is not limited to this. For example, the discharge limiting portion may be formed by a roof airbag that inflates and deploys downward from a vehicle width direction center portion of the roof of the vehicle cabin by gas being supplied into the roof airbag, and a roof inflator that supplies the gas into the roof airbag, and the discharge of gas from the vent hole 30 on the vehicle width direction inside may be limited by this roof airbag. The ECU 38 may also activate the roof inflator when the ECU 38 detects or predicts one of an asymmetric collision and a side collision on the side opposite the front seat.

In addition, the invention may be modified without departing from the scope thereof. Also, the scope of the invention is not limited by the example embodiments described above.

What is claimed is:

1. A vehicle occupant protection device comprising:
a frontal collision airbag that is provided in front of a front seat, and inflates and deploys by gas being supplied into the frontal collision airbag, and in which vent holes are provided in both a right side and a left side thereof;
a frontal collision inflator that supplies the gas into the frontal collision airbag by being activated;
a discharge limiting portion capable of limiting a discharge of the gas from one vent hole, from among the left vent hole and the right vent hole; and
a controller that activates the frontal collision inflator when a frontal collision is detected or predicted, and that controls the discharge limiting portion such that the discharge limiting portion more limits the discharge of the gas from the one vent hole than the discharge of the other vent hole when a configuration of the frontal collision is an asymmetric collision on a side with the one vent hole.

2. The vehicle occupant protection device according to claim 1, wherein
the discharge limiting portion includes a side collision curtain airbag that inflates and deploys to a vehicle width direction outside of an inflation and deployment region of the frontal collision airbag by gas being supplied into the side collision curtain airbag, and that is formed so as to contact a portion of the frontal collision airbag where the one vent hole on a vehicle width direction outside is formed when inflated and deployed when the frontal collision airbag is inflated and deployed, and a side collision inflator that supplies gas into the side curtain airbag by being activated; and
the controller activates the side collision inflator when one of an asymmetric collision and a side collision on a side with the side collision curtain airbag is detected or predicted.

3. The vehicle occupant protection device according to claim 2, wherein
the controller activates the side collision inflator later than the frontal collision inflator when the asymmetric collision on the side with the side collision curtain airbag is detected or predicted.

4. The vehicle occupant protection device according to claim 2, wherein
the side collision curtain airbag extends at an angle toward a vehicle front side and a vehicle width direction inside when inflated and deployed.

5. The vehicle occupant protection device according to claim 1, wherein
the discharge limiting portion is left and right opening and closing mechanisms capable of individually opening and closing the left and right vent holes; and
the controller controls the left and right opening and closing mechanisms such that the left and right vent holes open when the configuration of the frontal collision is a symmetrical collision, and controls the left and right opening and closing mechanisms such that the right or left vent hole on a side opposite the collision opens and the one vent hole on a collision side closes when the configuration of the frontal collision is an asymmetric collision.

6. The vehicle occupant protection device according to claim 5, wherein
the controller is provided with a seat belt fastening detecting portion for detecting a seat belt fastening state of an occupant seated in the front seat, and a collision detecting portion that includes a longitudinal acceleration sensor for detecting acceleration in a longitudinal direction of a vehicle.

7. The vehicle occupant protection device according to claim 5, wherein
the opening and closing mechanisms each include a closing member that closes the corresponding vent hole, and a micro gas generator that is connected to the corresponding closing member and is fixed to a vehicle side;
a portion of each closing member is sewn to the corresponding vent hole by a sewn portion;
a length dimension of each closing member from the corresponding micro gas generator is set such that the sewn portion will tear when the frontal collision airbag is deployed;
when the configuration of the frontal collision is the symmetrical collision, the right or left vent hole is opened by the controller not activating the micro gas generator; and when the configuration of the frontal collision is the asymmetric collision, the right or left vent hole on the side opposite the collision is opened by the controller not activating the micro gas generator that is connected to the closing member on the side opposite the collision, and the right or left vent hole on the collision side is closed by the controller activating the micro gas generator that is connected to the closing member on the collision side and cutting the connection with the closing member.

8. The vehicle occupant protection device according to claim 1, wherein the frontal collision inflator has a first gas generating portion and a second gas generating portion, each of which generates gas individually by being activated; and the controller activates the second gas generating portion later than the first gas generating portion when the configuration of the frontal collision is an asymmetric collision.

9. The vehicle occupant protection device according to claim 1, wherein the discharge limiting portion includes a roof airbag that inflates and deploys to a vehicle width direction inside of an inflation and deployment region of the frontal collision airbag by gas being supplied into the roof airbag, and that is formed so as to contact a portion of the frontal collision airbag where the one vent hole on a vehicle width direction inside is formed when inflated and deployed when the frontal collision airbag is inflated and deployed, and a roof inflator that supplies gas into the roof airbag by being activated; and the controller activates the roof inflator when one of an asymmetric collision and side collision on a side opposite the front seat is detected or predicted.

10. The vehicle occupant protection device according to claim 1, wherein the discharge limiting portion only limits the one vent hole.

11. The vehicle occupant protection device according to claim 1, wherein the controller controls the discharge limiting portion such that the discharge limiting portion discharges the gas from the vent holes when a configuration of the frontal collision is a symmetric collision.

12. A vehicle occupant protection device comprising:

a frontal collision airbag that inflates and deploys toward a front of a front seat by gas being supplied into the frontal collision airbag, and that is provided with a only one vent hole, the vent hole is positioned on an interior side of the frontal collision airbag in the vehicle width direction;

a frontal collision inflator capable of supplying the gas into the frontal collision airbag;

a discharge limiting portion capable of limiting a discharge of the gas from the vent hole; and a controller that activates the frontal collision inflator when a frontal collision is detected or predicted, and that limits the discharge of the gas from the vent hole by the discharge limiting portion when a configuration of the frontal collision is an asymmetric collision, wherein the discharge limiting portion is an opening and closing mechanism that opens and closes the vent hole;

the opening and closing mechanism includes a closing member that has a closing portion that closes the vent hole, and a micro gas generator to which the closing member is connected and that is fixed to a vehicle side;

the closing portion is sewn to the vent hole by a sewn portion, and a small diameter vent hole formed with a smaller diameter than the vent hole is formed;

a length dimension of the closing member from the micro gas generator is set such that the sewn portion will tear when the frontal collision airbag is deployed; and when the configuration of the frontal collision is an asymmetric collision, the discharge of the gas from the vent hole is limited by the controller activating the micro gas generator and cutting the connection with the closing member.

\* \* \* \* \*

UNITED STATES PATENT AND TRADEMARK OFFICE
CERTIFICATE OF CORRECTION

PATENT NO. : 9,296,360 B2
APPLICATION NO. : 14/463147
DATED : March 29, 2016
INVENTOR(S) : Tatsuya Komamura It is certified that error appears in the above-identified patent and that said Letters Patent is hereby corrected as shown below:

IN THE SPECIFICATION

In Column 5, Line 54, before "cylindrical connecting", insert --via a-- therefor.

Signed and Sealed this
Seventh Day of June, 2016

Michelle K. Lee
*Director of the United States Patent and Trademark Office*